United States Patent [19]

Blaschek

[11] Patent Number: 5,187,508
[45] Date of Patent: Feb. 16, 1993

[54] FILM TRANSPORT DEVICE

[75] Inventor: Otto Blaschek, Aschheim, Fed. Rep. of Germany

[73] Assignee: Arnold & Richter Cine Technik & Co. Betriebs KG, Munich, Fed. Rep. of Germany

[21] Appl. No.: 585,090

[22] PCT Filed: Mar. 25, 1989

[86] PCT No.: PCT/DE89/00198
§ 371 Date: Sep. 25, 1990
§ 102(e) Date: Sep. 25, 1990

[87] PCT Pub. No.: WO89/09430
PCT Pub. Date: Oct. 5, 1989

[30] Foreign Application Priority Data

Mar. 30, 1988 [DE] Fed. Rep. of Germany ....... 3810814
Mar. 30, 1988 [DE] Fed. Rep. of Germany ....... 3810815

[51] Int. Cl.⁵ .............................................. G03B 21/48
[52] U.S. Cl. .................................... 352/180; 352/182; 352/187
[58] Field of Search ............... 352/160, 166, 180, 187, 352/182

[56] References Cited

U.S. PATENT DOCUMENTS 3,565,521  2/1971  Butler et al. ......................... 352/180
3,819,258  6/1974  Butler et al. ......................... 352/180
4,022,525  5/1977  Boudouris et al. .................. 352/180
4,150,886  4/1979  Merkel et al. ....................... 352/180
4,215,921  8/1980  Miller .
4,697,896  10/1987  Fox ..................................... 352/180

FOREIGN PATENT DOCUMENTS

1891272  4/1964  Fed. Rep. of Germany .
2722378  5/1978  Fed. Rep. of Germany .
3217014  11/1983  Fed. Rep. of Germany .
2371701  6/1978  France .

Primary Examiner—Monroe H. Hayes
Attorney, Agent, or Firm—Fish & Richardson

[57] ABSTRACT

Film transport device for intermittent transport of a film (6), having at least one uniformly divided row of holes and being guided in a film channel, in which a film gate for projection of a frame located in front of the film gate is located, with transport being performed by a film transport sprocket whose teeth (10) to (14) and (20) to (24) engage film holes (71) to (75) and (81) to (85). The movement of the film is adjusted before the projection of a frame in such fashion that the leading or trailing flank of a tooth (10), (21) of the film transport sprocket, looking in the direction of rotation of the film transport sprocket, abuts the leading or trailing edge of at least one hole (71), (85) of the film perforation at the moment of projection of a frame.

14 Claims, 8 Drawing Sheets

FILM TRANSPORT DEVICE

The invention relates to a film transport device DE-PS 27 22 378 teaches a film transport device with a film transport sprocket intermittently driven by a drive motor, the teeth of said sprocket engaging the holes in the film with play and transporting said film stepwise. A control device controls the drive motor of the film transport sprocket in such fashion that the sprocket advances the film by one frame width at a time. The transport process is divided by a current pattern supplied to the drive motor of the film transport sprocket at each frame step, into an acceleration phase, a braking phase, and a final-positioning phase.

A mark detector is provided for final positioning, said detector, with a fixed spatial relationship to the individual frames, scanning marks on the film and generating from them control signals for the drive motor, so that the film, depending on the position of the deviation of the film-integral marks from a predetermined set position, is transported further forward or backward. Then the deviation from the set position is again detected and final positioning of the film repeated if required until the set position is reached. Either the holes in the film serve as film-integral marks, or marks exposed onto the film are used.

In the known film transport device, although the step control of the drive motor for the film transport sprocket is accomplished with a high degree of precision, because of the unavoidable play upon engagement of the teeth in the film holes, however, positioning errors occur which result in the frames not being located exactly in front of the film gate.

DE-OS 32 17 014 teaches a film transport device with a claw mechanism driven by a drive motor, the transport and locking claws of said mechanism engaging the film holes with play and advancing the film stepwise by one frame width at a time and final-positioning it at the film gate. Final positioning of the frames to be projected is accomplished either by using the frame to be reproduced itself or by using a reference mark associated with the frame.

In the event of a deviation of the individual film frame in the film gate from a preset position, a signal is generated by a sensor which is used to correct the deviation, with one of two wedge-shaped adjusting elements being moved in the direction of the film, thus shifting the film in the film transport direction or against the film transport direction.

DE-GM 18 91 272 teaches a device for pressing films in the film channel of a film projector with a claw mechanism, in which two guide wedges are rigidly disposed on the bottom of the film channel, symmetrically in the direction of film travel, and on the inside of the film path door for each guide wedge, at least two pressure wedges arranged in sequence in the film travel direction are individually spring mounted. When the film path door is closed, the pressure wedges press the film passing through against the guide wedges and clamp the film against the film gate.

The goal of the present invention is to improve the film transport device according to the species with respect to more precise final positioning of the film frames to be projected.

The solution according to the invention provides a film transport device with improved final positioning of the frames to be projected.

The solution according to the invention takes its departure from the fact that with a fixed spatial relationship between the film transport device and the film moved through the film transport device, even taking into account unavoidable play between the film holes and the teeth of a film transport sprocket engaging the film holes, exact positioning of each frame in front of the film gate is ensured. Such a fixed spatial relationshipo is provided when one tooth of the film transport sprocket engages, with zero play, the front or rear edge of a hole in the film at the moment a frame is projected.

If it is determined in this fashion which tooth of the film transport sprocket abuts the front or rear edge of a hole in the film, the movement of the film transport sprocket can be controlled so that the distance between the leading or trailing flank of this tooth and the gate is set for precise location of the individual frame in front of the film gate.

In an advantageous improvement of the invention, the movement of the film is adjusted by the sliding behavior of the film in the film channel in the vicinity of the film gate. The sliding behavior of the film can take place both as the result of increased or reduced mechanical friction of the film in the film channel and by the manner of the intermittent transport of the film in the movement phases between the individual frame positions.

Consequently, an additional feature of the solution according to the invention consists in the fact that the braking of the film in the braking phase is either so great that the film, during subsequent sequential control before projection of a frame, abuts the leading flank of at least one tooth of the film transport sprocket or the delay of the film in the braking phase is so low that during subsequent sequential control of the film before the projection of a frame, the trailing flank of at least one tooth of the film transport sprocket abuts the leading edge of a hole in the film.

An improvement on the solution according to the invention consists in the film being guided in the vicinity of the film gate between a film channel wall containing the film gate and a movable pressure plate, and by the pressure force of the pressure plate being adjustable relative to the film channel wall.

One advantageous improvement on this device is characterized by the fact that the pressure plate is located in a film stage movable for opening and closing the film channel and that the distance between the pressure plate and the film stage is adjustable, with the pressure plate preferably being spring-mounted in the film stage and the spring force being adjustable.

One special embodiment of the solution according to the invention consists in the tooth spacing of the film transport sprocket differing slightly from the spacing of the film holes, so that two teeth of the film transport sprocket, located in the engagement area of the teeth in the holes and spaced apart from one another, abut with their right-hand and left-hand tooth flanks the leading and trailing edges, respectively, of two correspondingly spaced holes in the film.

This design is based on the fact that, with a spacing of the teeth of the film transport sprocket different from the holes in the film, the film is always "stretched" between the leading flank of one tooth and the trailing flank of another tooth, while the intermediate teeth on the film transport sprocket engage the film holes with bilateral play. This produces a precise and definitive frame spacing as well as avoiding play, which causes noise, between the film holes and the teeth of the film transport sprocket that engage said holes.

In one advantageous improvement of the invention, the tooth spacing of the film transport sprocket is modified with respect to the spacing of the film holes in such fashion that over the length of engagement of the teeth of the film transport sprocket in the holes, the right-hand and left-hand tooth flanks of the teeth on the film transport sprocket which are at the engagement limits abut the leading and trailing edges, respectively, of the corresponding holes in the film. In this manner, the entire engagement length is used to "stretch" the film and simultaneously ensures protective handling of the film and avoids undesirable noises produced by scratching of the teeth of the film transport sprocket in the film holes.

Another advantageous improvement of the invention is characterized by the fact that the wrap angle of the film around the film transport sprocket is adjustable. In this manner, films with different hole widths can be positioned exactly, with the film being stretched, depending on the width of the holes, between two teeth on the film sprocket which are different distances apart.

One advantageous embodiment of this solution according to the invention is characterized by the fact that the film is guided between a film wedge and the film transport sprocket, with the film wedge having a recess matching the radius of the film transport sprocket and by the fact that the length of the trailing edge in the film wedge is adjustable. In this manner the film is forcibly guided over a larger or smaller number of teeth on the film transport sprocket, thus ensuring that, depending on the width of the holes in the film, a different number of teeth will be engaged and the film will be stretched between two teeth at different distances.

Another advantageous embodiment of the solution according to the invention for transporting a film with two uniformly distributed rows of holes using a film transport sprocket which has two tooth circles mounted on an axis, is characterized by the fact that the tooth circles are adjustable with respect to one another, so that in particular the tooth circles in the vertical projection have different tooth positions.

In contrast to the normal case, in which the upper and lower teeth of a film transport sprocket are made congruent, in this embodiment the parallel position of the individual teeth in the upper and lower tooth circles can be adjusted by twisting. As a result, manufacturing errors in the film transport sprocket, which are already caused by manufacturing tolerances, as well as shrinkage of the film, can be compensated, the play that causes noise between the film hole and the tooth circles is avoided, and the required exact frame position is achieved. In addition, this measure serves to compensate when positively and negatively perforated film is projected alternately.

Advantageous improvements of the invention are characterized in the subclaims or are described in greater detail below with reference to the figures in the description of the preferred embodiment of the invention.

Figure 1:
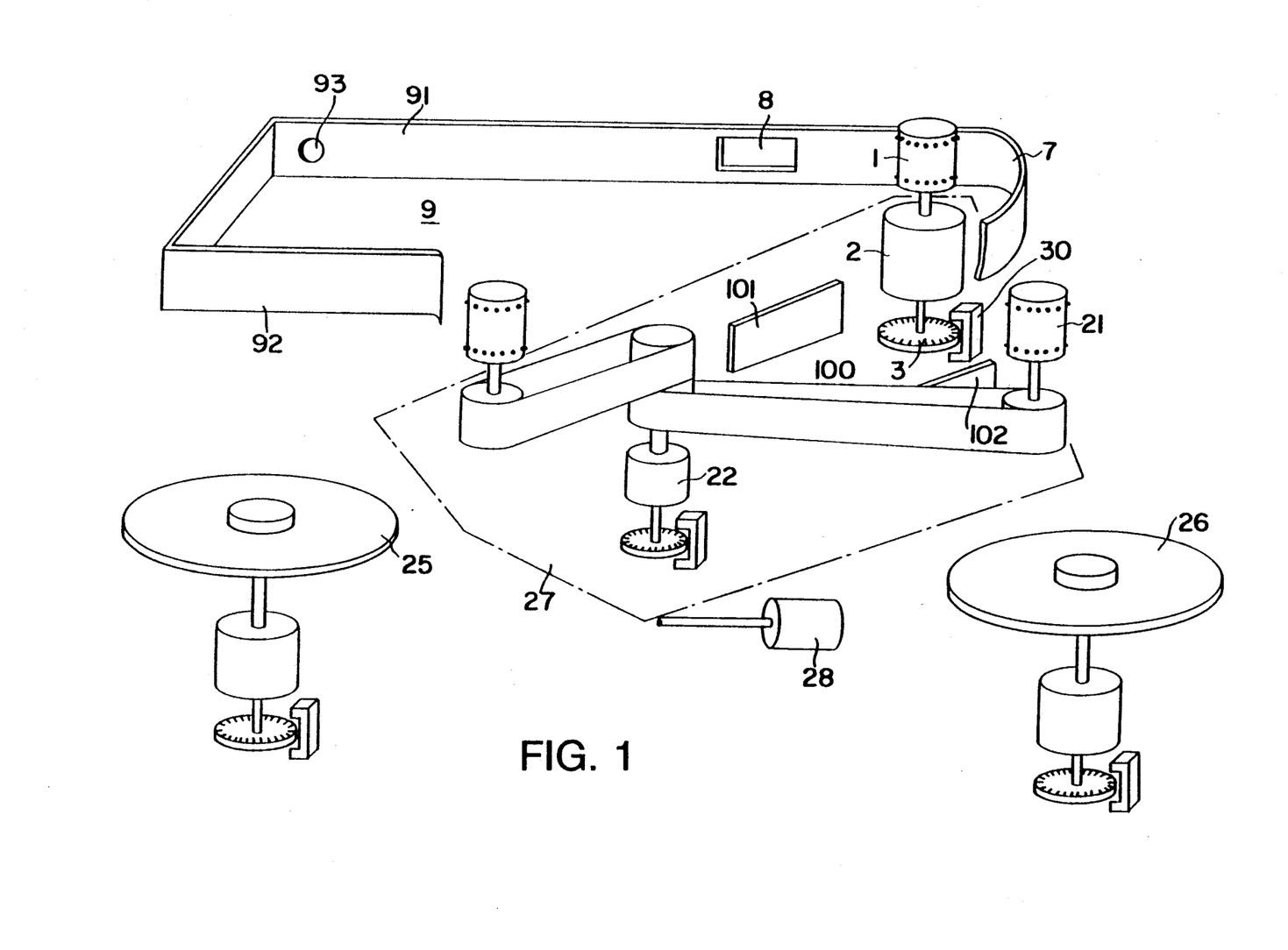
FIG. 1 is a schematic perspective diagram of the film channel with the individual drive parts.

The schematic perspective view of the film channel of a film projector shown in FIG. 1 shows a film transport device with film transport sprocket 1, drive motor 2, and an angle indicator disk 3, supply and takeup devices 20, 21 driven by a common drive device 22, the winding devices 25, 26 supporting the film reels, and, in a simplified schematic perspective view, the film loop channels 9, 100 serving to receive the film loops on both sides of film gate 8.

Drive motor 2, consisting of a high-dynamic DC servo motor, transmits its rotary motion through the directly driven film transport sprocket 1 to the film. Drive motor 2 is permanently connected to angle indicator disk 3 by a shaft, so that the exact position of drive motor 2 is determined by means of an optoelectronic position sensor and can be passed on.

Film loop channels 9, 100 serve to receive the film loops formed on both sides of film gate 8, with a loop-measuring device 93 being provided in film loop channel 9 located to the left of film gate 8. Loop measuring device 93 can consist of a reflected light housing or a luminous diode (LED) in conjunction with a phototransistor opposite.

Film loop channel 9 is formed by two film loop channel walls 91, 92, with film loop channel wall 91 containing film gate 8 and is designed in the vicinity of film transport sprocket 1 as film wedge 7, which steers the film around the film transport sprocket An adjusting carriage 27 mounted on suitable guides is driven by an adjusting motor 28 and supports the imaging optics, the film transport device including a film stage with a film pressure plate, supply and takeup devices 20, 21, a pivot wedge, and drive device 22.

Figure 2:
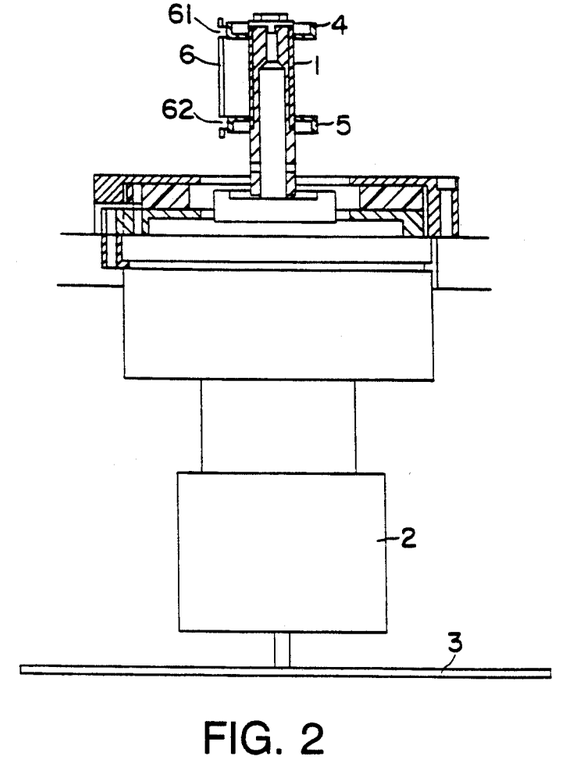
FIG. 2 is a cross section through a film transport device with a film transport sprocket.

The cross section shown in FIG. 2 through a film transport device shows a film transport sprocket provided with two tooth circles 4, 5, said sprocket being permanently coupled with a shaft of a drive motor 2, on whose shaft an angle indicator disk 3 for exact positioning of drive motor 2 is also mounted. The upper and lower tooth circles 4, 5 of film transport sprocket 1 engage corresponding rows of holes 61, 62 in a film 6, with engagement being produced by a guide, not shown in greater detail, in the form of a film wedge or the like. The engagement of the teeth of the film transport sprocket in the film holes takes place over a circumferential area of the film sprocket which depends on the film path, so that several teeth in each tooth circle 4, 5 of film transport sprocket 1 simultaneously engage matching holes in the film. Usually, four to six teeth of film transport sprocket 1 simultaneously engage the film holes.

Engagement of the teeth of film transport sprocket 1 in the holes takes place while maintaining a certain amount of play, i.e., the thickness of the teeth of film transport sprockets is less than the width of the holes. In this manner, the teeth of film transport sprocket 1 are prevented from abutting the sides of the perforations on both sides, which, because of the film tension, would result in damage to the holes in the film and in an increased noise level. This play between the teeth of film transport sprocket 1 and the holes in the film, however, results, even with maintenance of a predetermined film tension, in inexact positioning of the individual frames in front of film gate 8, so that the advantage of exact positioning using an angle indicator system for drive motor 2 is cancelled by this inexact guidance of film 6.

Figure 3:
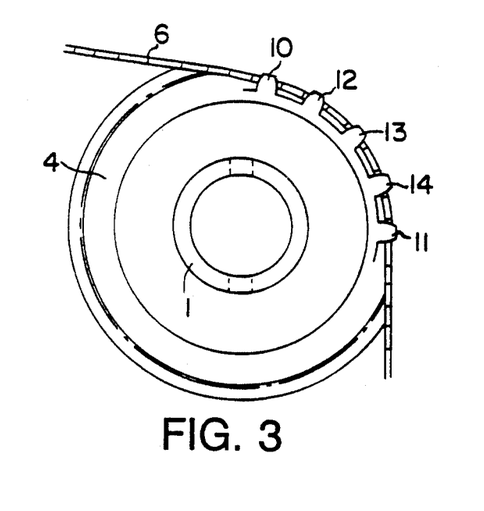
FIG. 3 is a top view of a row of teeth in a film transport sprocket engaging the holes in a film.

In order to transfer the exact positioning of the film, created by the use of a drive motor for the film transport sprocket with an angle indicator system, to the positioning of the film in front of the film gate, the movement of film 6 before projection of a frame is adjusted so that the leading or trailing flank of a tooth 10 to 14 of film sprocket 1, looking in the direction of rotation of film transport sprocket 1, according to FIG. 3 abuts the leading or trailing edge of at least one hole in the film at the moment a frame is projected.

FIG. 3 shows a tooth 11 located at the limit of engagement, said tooth abutting the leading flank of a matching hole in the film perforations in film 6.

Figure 4A:
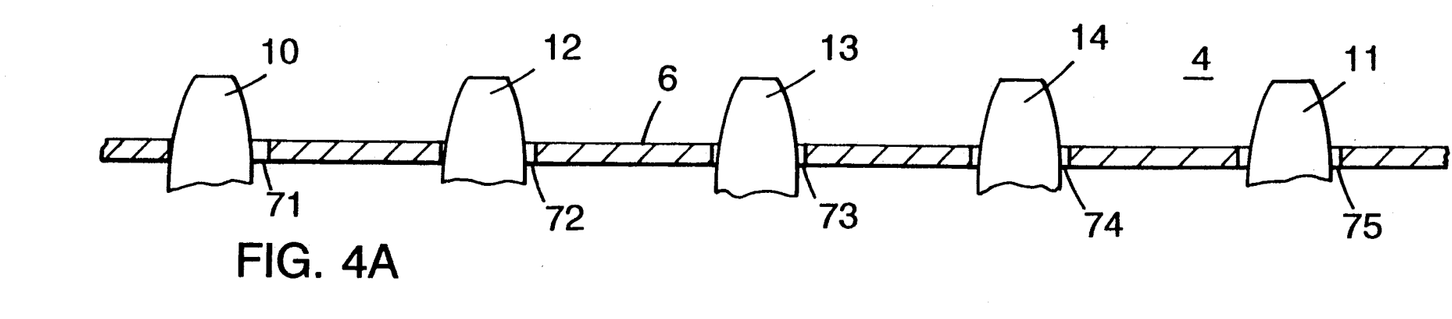
FIGS. 4A and 4B are schematic developed views of the teeth in the film transport sprocket engaging the film holes.
Figure 4B:
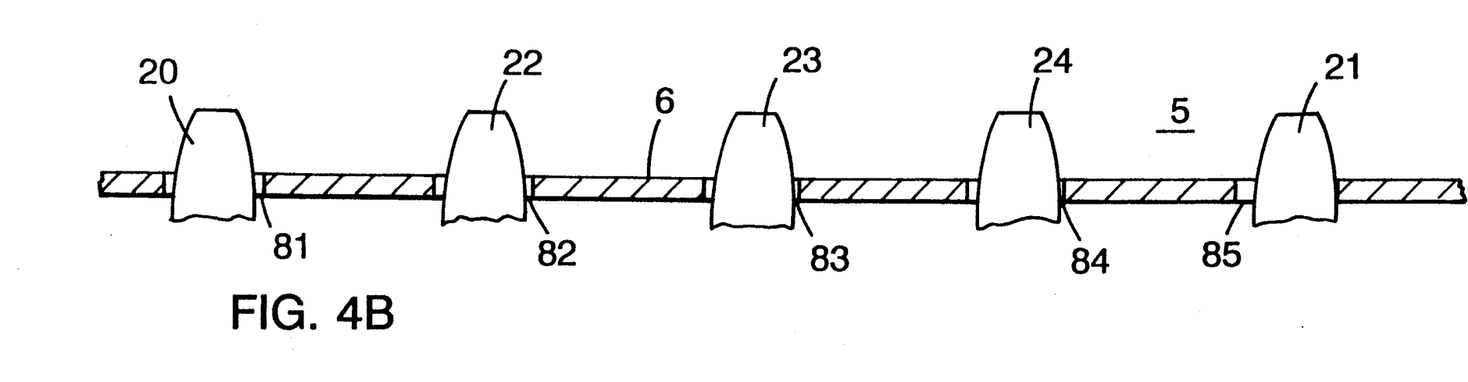

FIG. 4 illustrates the principle according to the invention in a developed view of the area of engagement of the teeth of the film transport sprocket in the holes.

In FIG. 4A, with the film being transported in a direction indicated by the arrow, the trailing edge of tooth 10 of the film transport sprocket abuts the trailing flank of hole 71 in the film, while the other teeth 11 to 14 engaging the holes in the film, on the film transport sprocket, engage holes 72 to 75 with play. In this manner, film 6 has its position fixed so that exact positioning of the individual frames in front of the film gate corresponding to the exact position of the drive motor is ensured. At the same time, all of the teeth in engagement are prevented from sliding along the edges of the holes and thus prematurely wearing out the holes in the film or creating undesirable noise.

In FIG. 4B, with the film moving in the direction of transport indicated by the arrow, the leading edge of tooth 21 of the film transport sprocket abuts the leading flank of hole 85 in the film, while the other teeth 20 to 24 on the film transport sprocket which are in engagement with the film holes engage holes 81 to 84 with play. Here again, film 6 has its position fixed so that exact positioning of the individual frames in front of the film gate according to the exact positioning of the drive motor is ensured. At the same time, all of the teeth in engagement are prevented from sliding along the edges of the holes and thus prematurely wearing out the holes or creating undesired noise.

The determination of which of the teeth of the film transport sprocket in engagement with the holes in the film is to abut the leading or trailing flanks of the film holes selectively or in combination, is made by the control of the transport pattern and by the sliding behavior of the film in the film channel.

Figure 5A:
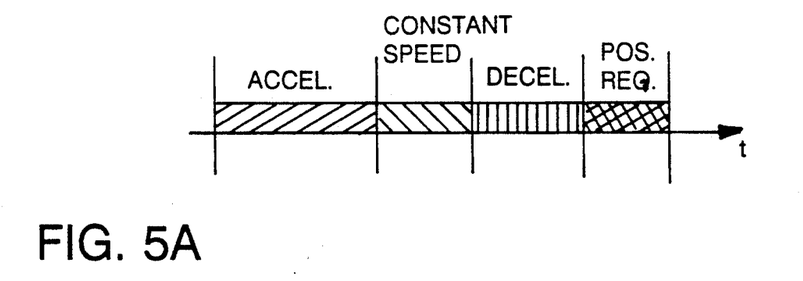
FIGS. 5A–5C are graphs graph showing the transport pattern with sequential control.
Figure 5B:
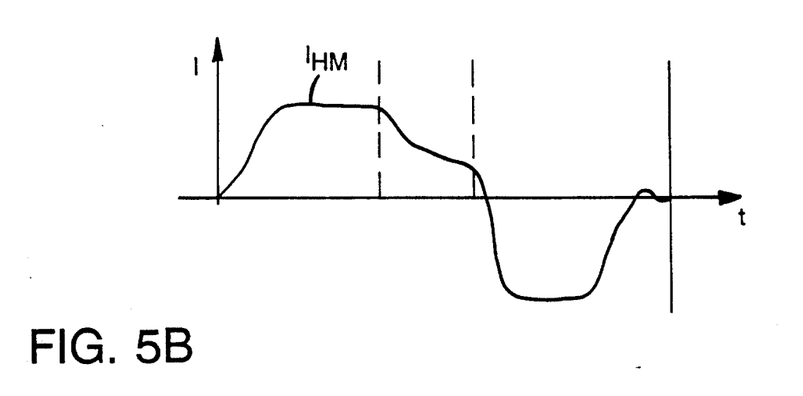
Figure 5C:
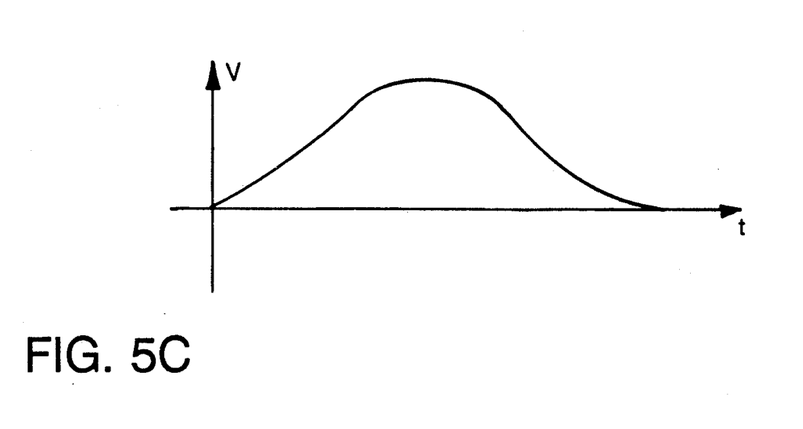

To clarify the function of the method according to the invention, FIG. 5 shows the control signal pattern as a function of time for the main motor, the motor current, and the film speed.

FIG. 5A shows the individual motor control signals whose duration is set by the individual angle indicator measurement points plus the time delays preset by timers. The individual motion segments of the main motor and hence of the film are composed of an acceleration, a constant, and a deceleration phase (braking phase) as well as a final-positioning phase in which the frame to be positioned is positioned precisely in front of the film gate. This exact positioning is accomplished with the aid of the angle indicator disk, so that measurement and regulation of the film position by detecting a film mark, for example by reading holes, is not necessary.

FIG. 5B shows the pattern of the motor current and hence of the torque of main motor 2 in the acceleration, constant, and deceleration phases as well as the final-positioning phase.

FIG. 5C shows the speed pattern over one image step and illustrates the parabolic and hence gently rising speed in the acceleration phase and the gently decreasing speed in the deceleration and final-positioning phases.

According to the invention, the transport pattern is set so that at the beginning of the position-regulating phase the speed of the film is greater than zero and in the position-regulating phase the film is "braked," with the trailing edge of a tooth on the film transport sprocket abutting the trailing flank of a hole, or so that at the beginning of the position-regulating phase the speed of the film is equal to zero and in the position-regulating phase the film is "pulled" into the correct position, with the trailing edge of a tooth on the film transport sprocket abutting the leading flank of a hole.

By appropriately adjusting the transport pattern, therefore, specific conditions can be created for precise positioning of the film frame.

Alternatively, or in addition, the sliding behavior of the film in the film channel can be influenced so that the film in the final-positioning phase is either decelerated or pulled into the correct position in front of the film gate. For this purpose, the friction conditions in the film channel are adjusted accordingly.

Figure 6:
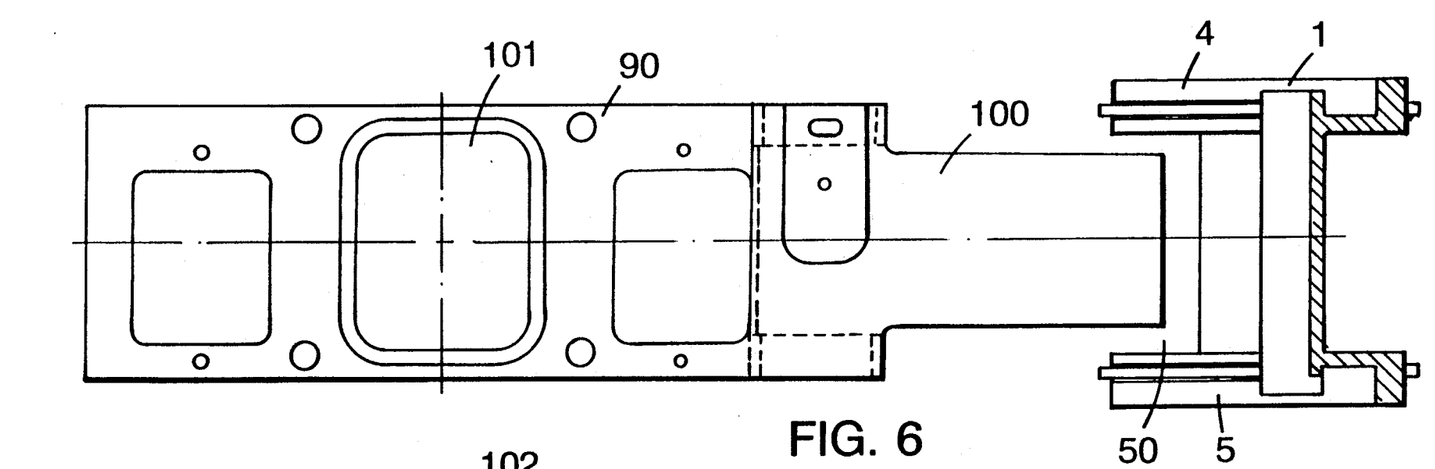
FIG. 6 is a side view of the film stage with a film guide plate and film transport sprocket.

FIG. 6 shows a side view of film stage 90 which presses the film, with the film channel in the closed position, against a film channel wall which contains the film gate for projecting frames.

Figure 7:
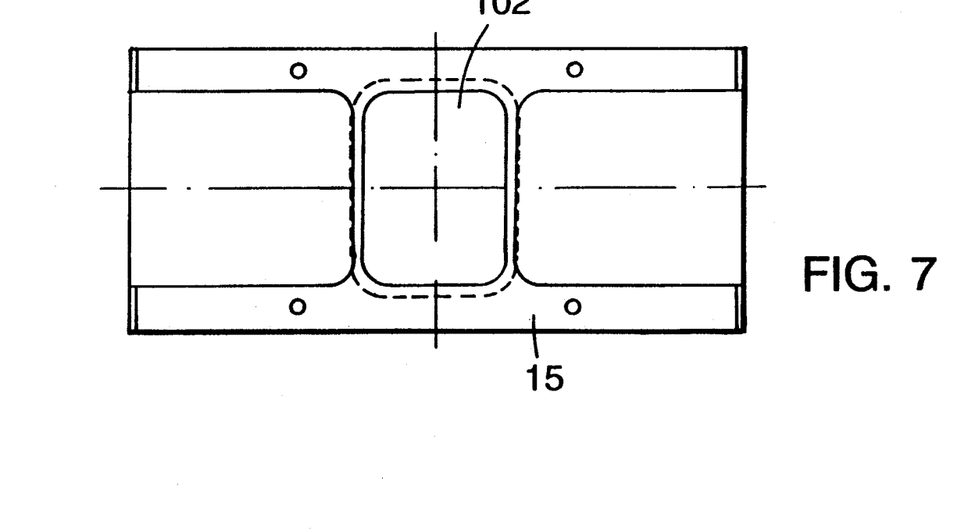
FIG. 7 is a side view of a pressure frame mounted in the film stage.

For this purpose, a pressure frame 15, shown in side view in FIG. 7, is spring-mounted in the film stage. Film stage 90 and pressure frame 15 have window-shaped openings 101, 102, with the window-shaped opening 102 of pressure frame 15 corresponding to the frame format of the film.

On the side of film transport sprocket 1, film stage 90 is provided with a film guide plate 100 which engages a recess 50 between tooth circles 4, 5 of film transport sprocket 1. The nature of the engagement is shown in the drawing in FIG. 8.

Figure 8:
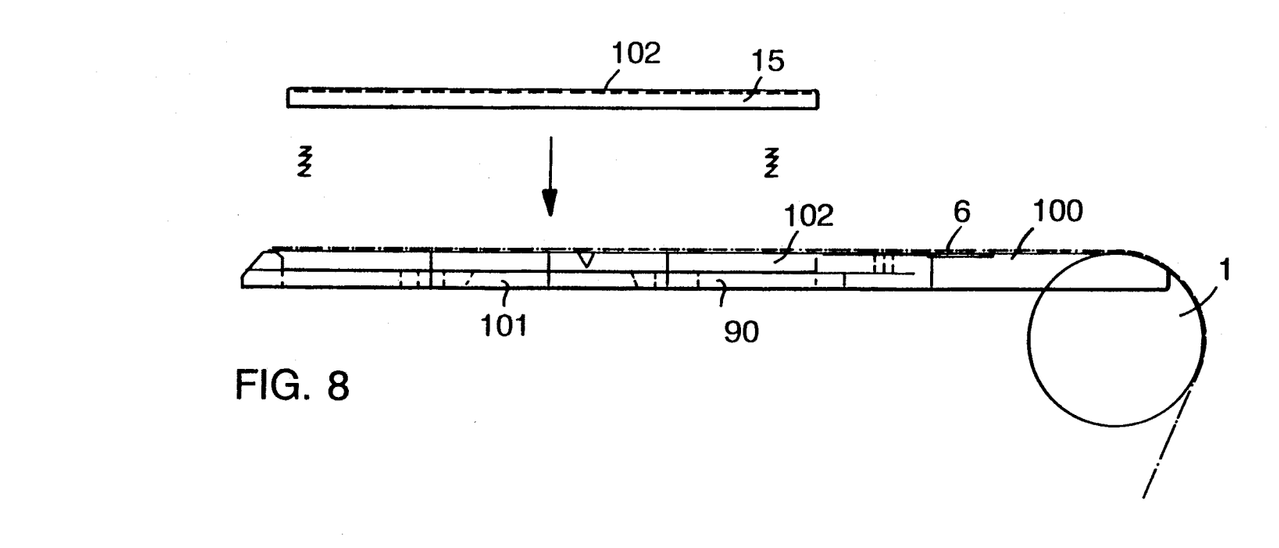
FIG. 8 is a top view of the film stage and pressure frame as well as film transport sprocket.

FIG. 8 shows in top view film stage 90, which has a recess 102, in which pressure frame 15 is spring-mounted. Pressure frame 15, when the film channel is in the closed state, presses film 6, represented by the dot-dashed lines, against the film channel wall, not shown in greater detail, so that with intermittent transport of the film by means of film transport sprocket 1, one frame at a time located in front of the film gate in the film channel wall is illuminated through openings 101, 102 in the film stage or the pressure frame by a projection bulb.

Film guide plate 100 fits into recess 50 between tooth rows 4, 5 of film transport sprocket 1 in such fashion that it matches the radius of film transport sprocket 1, and thus permits continuous deflection of the film between the film stage and the pressure frame, film channel wall, film transport sprocket, and film pressure wedge 7.

By an exact adjustment of the distance between pressure frame 15 and film stage 90, the pressure on the film sliding between pressure frame 15 and the film channel wall can be determined and the frictional conditions thus ascertained.

Figure 9:
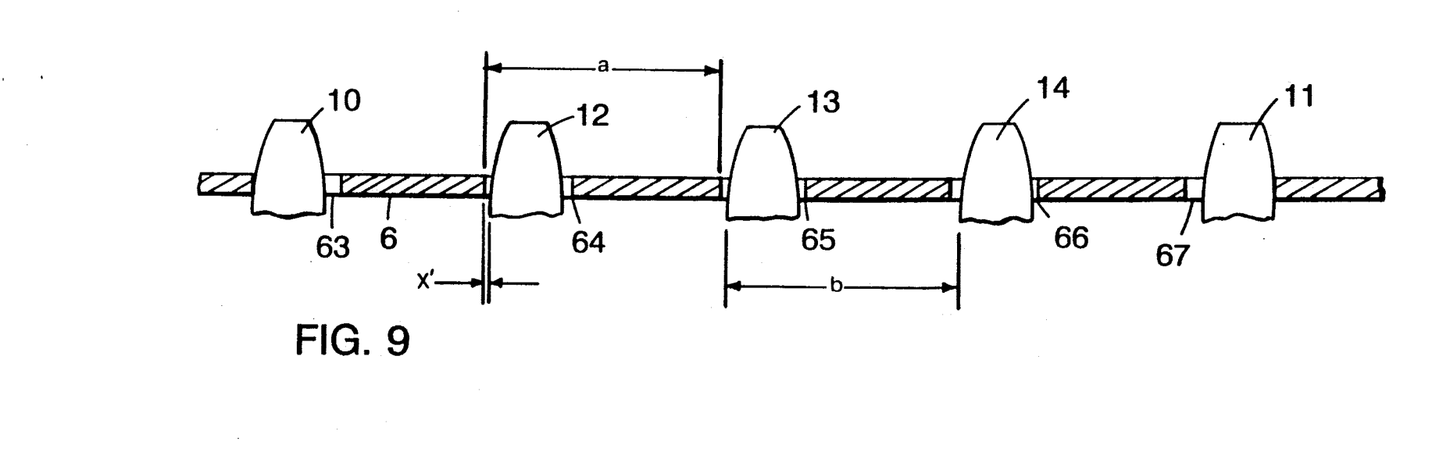
FIG. 9 is a schematic developed view of the teeth of the film transport sprocket which engage the film holes.

In order to transfer the exact positioning of the film, created by the use of a drive motor for the film transport sprocket with an angle indicator system, to the positioning of the film in front of the film gate, according to FIG. 9 the tooth spacing of the film transport sprocket is modified relative to the spacing of the film holes so that the right-hand or left-hand tooth flank of two teeth, lying in the engagement area of the teeth of the film transport sprocket and spaced apart from one another, abut the leading or trailing edge, respectively, of two corresponding holes in the film.

According to FIG. 3, these are the teeth 10 and 11 lying at the engagement limits, said teeth abutting the leading and trailing flanks, respectively, of the corresponding holes in film 6 with their right-hand and left-hand flanks, respectively, while the teeth between them engage the holes with bilateral play.

FIG. 9 shows the principle according to the invention in a developed view of the area of engagement of the teeth of the film transport sprocket in the film holes.

The film holes have a spacing a usually equal to 4.74 mm. The tooth spacing b of the film transport sprocket is larger by an amount x than this film spacing a. This ensures that the tooth 10 which is foremost in the transport direction has its left flank abutting the leading edge of hole 63 in the film, with the transport direction in FIG. 9 being indicated by an arrow. The following teeth 12, 13, 14 engage the following holes 64, 65, 66 in the film with bilateral play, while tooth 11 has its trailing flank abutting the trailing edge of hole 67 in the film. In this manner, film 6 is stretched between the corresponding flanks of teeth 10 and 11 of the film transport sprocket and hence has its position fixed, so that exact positioning of the individual frames in front of the film gate corresponding to the exact positioning of the drive motor is ensured. At the same time, the situation in which all of the teeth in engagement slide along the edges of the holes, thus causing premature wear to the holes and/or creating undesirable noise, is avoided.

Teeth 10, 11 of the film transport sprocket can lie at the limits of the engagement area of the teeth of the sprocket in the holes; they can also be located in this area, however.

The profile shift is advantageously made dependent upon the diameter of the film transport sprocket, so that it increases with increase in diameter. Thus, in a film transport sprocket with a diameter of 30.17 mm, the profile shift x=0.02 mm, while in a film transport sprocket with a diameter of 30.43 mm, x=0.06 mm.

The tooth profile itself is advantageously designed in accordance with DIN 15530, Part 1, which ensures an especially protective engagement in the holes in the film and a low noise level.

Since there are films with different widths of holes (negative stock with a hole width of 1.85 mm and positive stock with a hole width of 1.98 mm) with the holes spaced equally at 4.74 mm, stretching the film between two spaced teeth of film transport sprocket 1 could only be used for one type of stock.

Therefore, in an improvement of the invention, the wrap angle of the film around the film transport sprocket is made adjustable, so that, depending on the width of the holes of the film in question, more or fewer teeth of the film transport sprocket are engaged and the film is tensioned between the flanks of differently spaced teeth of the film transport sprocket.

Figure 10A:
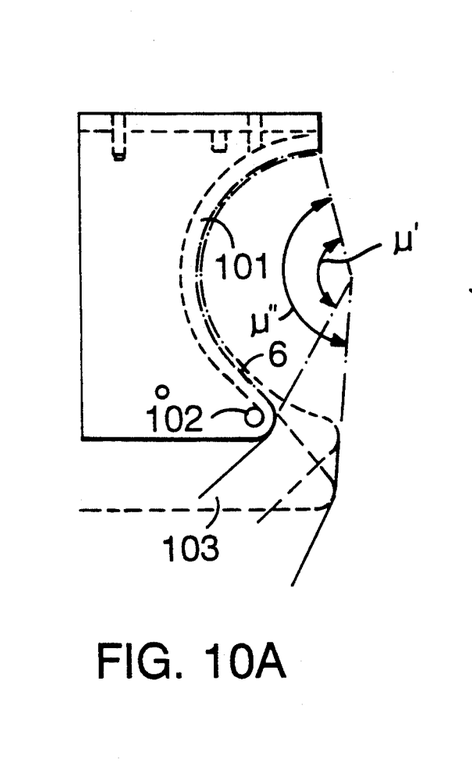
FIG. 10 is a schematic top view of a film wedge with an adjustable trailing edge and a film transport sprocket at a distance from the film wedge.
Figure 10B:
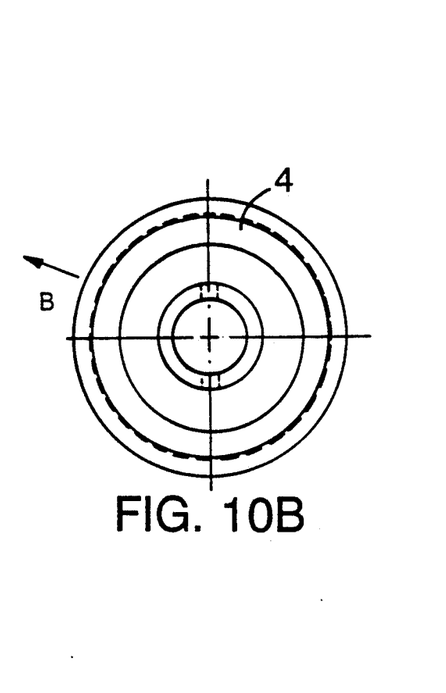

FIG. 10 is a schematic top view of a film wedge 7 with adjustable trailing edge 113 and a film transport sprocket 1 which engages the recess 111 of film wedge 7 when the film channel is closed in the direction of arrow B, so that film 6 is guided between film wedge 7 and film transport sprocket 1.

By changing the length or the slope angle of trailing edge 113 of the film wedge, the wrap angle $\mu$ of film 6 around film transport sprocket 1 is changed, so that, for example, when negative stock is used with a hole width of 1.85 mm, a smaller wrap angle $\mu'$ is produced than the wrap angle $\mu''$ when using a positive stock with a hole width of 1.98 mm.

The lengthening of trailing edge 113 of film wedge 7 can be achieved by folding and unfolding an extension in the vicinity of an articulation point 112 shown schematically. Alternatively, trailing edge 113 can be extended telescopewise out of film wedge 7, when a larger wrap angle around the film transport sprocket is required.

When using a film with two rows of holes spaced apart from one another, it is possible for either only one or both rows of holes to be "stretched," with the tooth spacing of only one row of teeth 4 or 5, as shown in FIG. 2, or the tooth spacing of both tooth rows 4, 5 to be changed relative to the spacing of the holes in the film.

Figure 11:
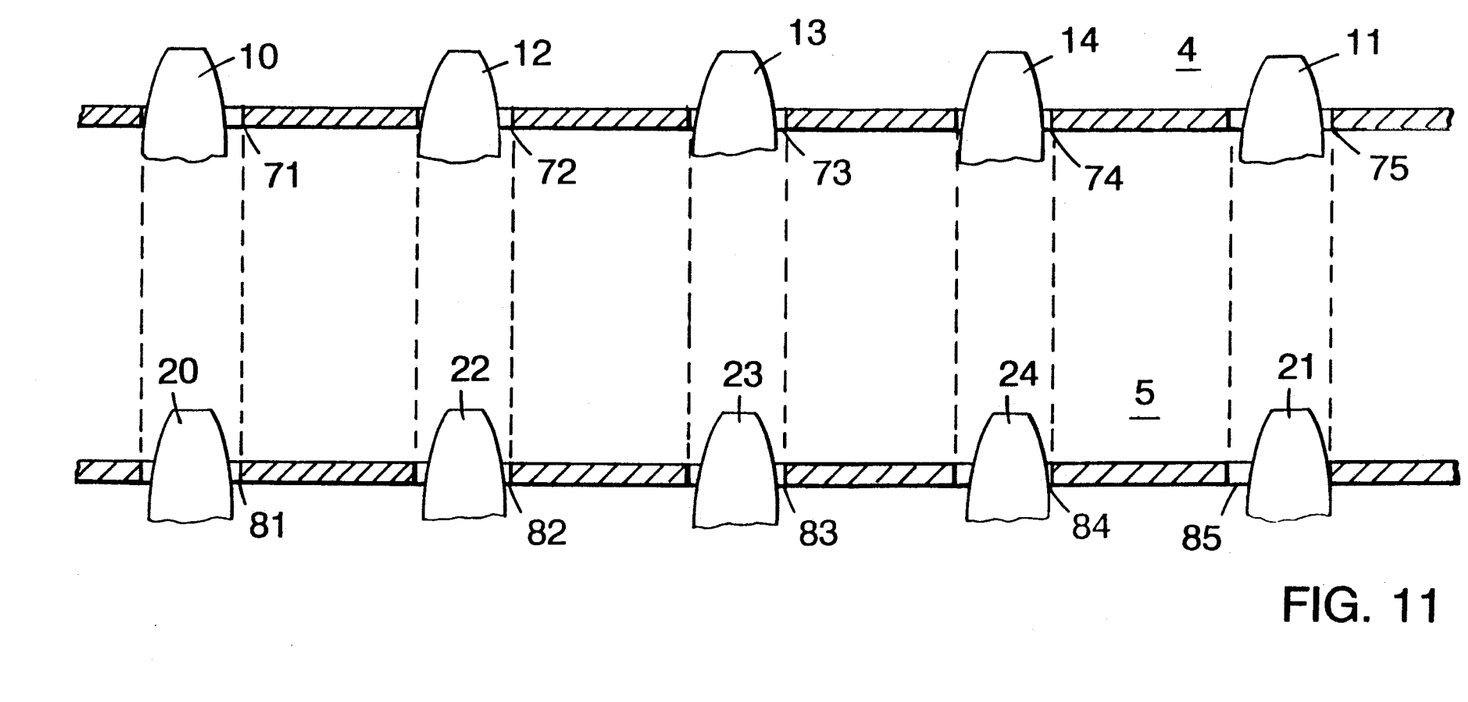
FIG. 11 is a schematic developed view of the teeth of an upper and lower tooth circle of the film transport sprocket which engage the film holes.

FIG. 11 shows a schematic developed view of the teeth of an upper and lower tooth circle 4, 5 of the film transport sprocket that engage the holes in the film. According to another feature of the invention, the two tooth circles 4, 5 are adjustable with respect to one another, so that the design for the upper and lower teeth of a film transport sprocket, which in normal cases are congruent, has a different position of the teeth of the upper and lower tooth circles in the vertical projection.

The teeth of the upper and lower tooth circles 4, 5, similarly to the embodiments described above, engage the film holes; the right tooth flank of the first and the left tooth flank of the last tooth of the respective tooth circle 4, 5 in engagement abut the leading and trailing edges of the respective holes in the film with zero play.

In FIG. 11, teeth 10 to 14 of upper tooth circle 4, similarly to the illustration in FIG. 9, engage holes 71 to 75 of one row of holes in the film, while teeth 20 to 24 of lower tooth circle 5 engage holes 81 to 85 in the other row of holes in the film. To clarify the position of the individual teeth in the upper and lower tooth circles, the position of the teeth of upper tooth circle 4 is shown as dashed lines on the position of the teeth of the lower tooth circle 5, with the deviation of the position of the teeth of the upper and lower tooth circles 4 and 5 being made clear.

While the left flank of tooth 10 of upper tooth circle 4 abuts the edge of hole 71 with zero play and tooth 11 of upper tooth circle 4 abuts the edge of hole 75 with its right-hand tooth flank, at the moment in film transport shown, only the right-and tooth flank of tooth 24 of lower tooth circle 5 abuts the flank of hole 84 of the other row of holes in the film with zero play. By properly adjusting upper tooth circle 4 relative to lower tooth circle 5, or vice versa, the conditions shown in FIG. 6 can be altered at will, and in particular, the upper and lower tooth circles 4 and 5 can be made congruent.

In this manner, manufacturing errors caused by manufacturing tolerances, for example, in the film transport sprocket as well as shrinkage of the film can be compensated and noise-producing play can be avoided, and the required frame position can be obtained. At the same time, the mutual adjustability of the tooth circles allows compensation when alternately projecting film with positive and negative holes.

The invention is not limited to the preferred embodiment described above. Rather, a number of variations are possible which utilize the solution shown, even in fundamentally different embodiments.

I claim:

1. Film transport device for transporting a film stepwise along a film gate within a film channel, said film having a series of frames, each said frame having an integral mark associated therewith, each film step consisting of an acceleration phase acting on the film, a braking phase, and a final-positioning phase, comprising:
    a film transport sprocket with at least one tooth circle having teeth for engaging a film perforation with play, each of said teeth has a trailing flank and a leading flank,
    a drive motor for driving said film transport sprocket,
    a control device for controlling said drive motor in such fashion that said film transport sprocket advances said film by one frame width at a time and then final-positions each frame at said film gate such that an integral mark of said film is always in the same position,
    and circuitry for supplying a current pattern to said drive motor such that at the end of each film step, before final-positioning of the frame, said film overtakes the teeth of said film transport sprocket and is final-positioned by the leading flank of a tooth within the teeth in engagement with said film perforation.

2. Film transport device according to claim 1, wherein the braking of the film in said braking phase is so great that in subsequent adjustment before projection of the frame, the leading flank of at least one tooth of said film transport sprocket abuts the trailing edge of a hole of the film perforation.

3. Film transport device according to claim 1, wherein the deceleration of the film in said braking phase is so slight that in a subsequent adjustment before projection of the frame, the trailing flank of at least one tooth of said film transport sprocket abuts the leading edge of a hole of the film perforation.

4. Film transport device according to claim 1, wherein the movement of the film is adjusted by the sliding behavior of said film in the film channel in the area of said film gate.

5. Film transport device according to claim 4, further including a pressure frame and manually adjustable spring structure, said pressure frame being provided in the vicinity of said film gate and urged by said manually adjustable spring structure, with the pressure force being presettable by said spring structure.

6. Film transport device according to claim 1, wherein the tooth spacing of said film transport sprocket differs slightly from the spacing of the holes of the film perforation, so that two teeth of said film transport sprocket located in the engagement area of the teeth with the film perforation and spaced apart from one another have their right-hand and left-hand flanks abutting leading and/or trailing edges, respectively, of two suitably spaced holes of the film perforation.

7. Film transport device according to claim 6, wherein the tooth spacing of said film transport sprocket relative to the spacing of the holes of the film perforation is such, so that over the length of engagement of the teeth of the film transport sprocket with the holes of the film perforation, the right-hand or left-hand flanks of the teeth of said film transport sprocket located at the engagement limits abut leading and/or trailing edges, respectively, of the corresponding holes of the film perforation.

8. Film transport device according to claim 6 or 7, wherein the tooth spacing of said film transport sprocket is slightly larger than the spacing of the holes of the film perforation.

9. Film transport device according to claim 1 and further including structure for varying the wrap angel $\mu$ of the film around said film transport sprocket.

10. Film transport device according to claim 9 and further including a film wedge, the film being guided between said film wedge and said film transport sprocket, said film wedge having a recess matching the radius of said film transport sprocket and trailing edge structure whose length is adjustable, and said trailing edge structure being movable around a pivot joint.

11. Film transport device according to claim 1, for use with a film having two rows of film perforations spaced apart from one another, wherein the tooth spacing of only one tooth circle of said film transport sprocket relative to the holes of the film perforation is such that the film is stretched on one side.

12. Film transport device according to claim 1 for transporting a film having two perforation rows with uniformly distributed holes, and the spacing of teeth of said film transport sprocket relative to the holes of the film perforations being such that the film is stretched on both sides.

13. Film transport device according to claim 1 for transporting a film having two perforation rows with uniformly distributed holes, wherein said film transport sprocket has two tooth circles mounted on an axis and being adjustable with respect to one another.

14. Film transport device according to claim 1 wherein said integral mark is one edge of the holes of said film perforations running perpendicularly to the transport direction of said film.

* * * * *

UNITED STATES PATENT AND TRADEMARK OFFICE
CERTIFICATE OF CORRECTION

PATENT NO.   : 5,187,508

DATED        : February 16, 1993

INVENTOR(S)  : Otto Blaschek

It is certified that error appears in the above-identified patent and that said Letters Patent is hereby corrected as shown below:

Col. 4, line 47, insert --.-- after "sprocket".

Signed and Sealed this

Twenty-sixth Day of April, 1994

Attest:

BRUCE LEHMAN

*Attesting Officer*            *Commissioner of Patents and Trademarks*